(12) United States Patent
Zillmann et al.

(10) Patent No.: US 9,780,921 B2
(45) Date of Patent: Oct. 3, 2017

(54) PACKET DETECTION AND BANDWIDTH CLASSIFICATION FOR VARIABLE-BANDWIDTH PACKETS

(71) Applicant: QUALCOMM Incorporated, San Diego, CA (US)

(72) Inventors: Peter Zillmann, Nuremberg (DE); Christoph Arnold Joetten, Wadern (DE); Christian Pietsch, Nuremberg (DE); Nicola Varanese, Nuremberg (DE)

(73) Assignee: QUALLCOMM Incorporated, San Diego, CA (US)

( * ) Notice: Subject to any disclaimer, the term of this patent is extended or adjusted under 35 U.S.C. 154(b) by 318 days.

(21) Appl. No.: 14/329,651

(22) Filed: Jul. 11, 2014

(65) Prior Publication Data
US 2016/0014005 A1    Jan. 14, 2016

(51) Int. Cl.
*H04L 1/00* (2006.01)
*H04L 25/02* (2006.01)

(52) U.S. Cl.
CPC .......... *H04L 1/0083* (2013.01); *H04L 1/0039* (2013.01); *H04L 25/0262* (2013.01)

(58) Field of Classification Search
CPC .......................... H04L 43/0894; H04L 1/0083
See application file for complete search history.

(56) References Cited

U.S. PATENT DOCUMENTS

| | | | |
|---|---|---|---|
| 5,506,865 A | 4/1996 | Weaver, Jr. | |
| 6,377,618 B1 * | 4/2002 | Prasad | H04L 1/0046 375/142 |
| 6,798,736 B1 | 9/2004 | Black et al. | |
| 7,751,520 B1 | 7/2010 | Zeng et al. | |
| 8,457,162 B2 | 6/2013 | Aytur et al. | |
| 2004/0125771 A1 * | 7/2004 | Subrahmanya | H04L 25/0228 370/332 |
| 2013/0094619 A1 | 4/2013 | Shellhammer et al. | |

OTHER PUBLICATIONS

Murias, R., "Preamble Format for 1 MHz Beamforming", IEEE Document No. IEEE 802.11-12/0627r1, InterDigital Communications, May 14, 2012, 7 pages.
Shao, H-R., et al., "802.11ah Channelization Proposal for US," IEEE Document No. IEEE 802.11-11/1516r0, Samsung Electronics, Nov. 7, 2011, 7 pages.
Terry, J., et al., "OFDM Wirelss LANs: A Theoretical and Practical Guide," Chapter 2, "Synchronization" (pp. 48-61), Sams Publishing, 2002, 17 pages.

* cited by examiner

*Primary Examiner* — Benjamin H Elliott, IV
*Assistant Examiner* — Kevin Lee
(74) *Attorney, Agent, or Firm* — Paradice and Li LLP

(57) ABSTRACT

A receiver receives packets without prior knowledge of their bandwidths. The receiver calculates a first auto-correlation function for a first channel, a second auto-correlation function for a second channel, and a dot product of the first auto-correlation function and the second auto-correlation function. A packet is detected and its bandwidth classified based at least in part on the dot product.

19 Claims, 10 Drawing Sheets

PACKET DETECTION AND BANDWIDTH CLASSIFICATION FOR VARIABLE-BANDWIDTH PACKETS

TECHNICAL FIELD

The present embodiments relate generally to packet detection, and specifically to bandwidth classification.

BACKGROUND OF RELATED ART

A wireless network may include channels with different bandwidths. Packets transmitted on channels with different bandwidths may have different preambles. For example, the proposed IEEE 802.11ah ("802.11ah") WiFi standard includes channels with bandwidths of 1, 2, 4, 8, and 16 MHz. The 1 MHz packets have different preambles than the 2, 4, 8, and 16 MHz packets. The use of different preambles complicates packet detection: packet detection should be performed reliably without prior knowledge of the packet bandwidth.

SUMMARY

In some embodiments, a method of packet detection and bandwidth classification includes calculating a first auto-correlation function for a first channel, calculating a second auto-correlation function for a second channel, calculating a dot product of the first auto-correlation function and the second auto-correlation function, and detecting a packet. Detecting the packet includes classifying a bandwidth of the packet based at least in part on the dot product.

In some embodiments, a receiver includes auto-correlation circuitry to calculate a first auto-correlation function for a first channel and a second auto-correlation function for a second channel. The receiver also includes dot-product circuitry to calculate dot products of the first auto-correlation function and the second auto-correlation function, and logic to detect packets and classify packet bandwidths based at least in part on the dot products.

In some embodiments, a non-transitory computer-readable storage medium stores one or more programs configured for execution by one or more processors. The one or more programs include instructions to calculate a first auto-correlation function for a first channel, instructions to calculate a second auto-correlation function for a second channel, instructions to calculate a dot product of the first auto-correlation function and the second auto-correlation function, and instructions to detect a packet. The instructions to detect the packet include instructions to classify a bandwidth of the packet based at least in part on the dot product.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1A:
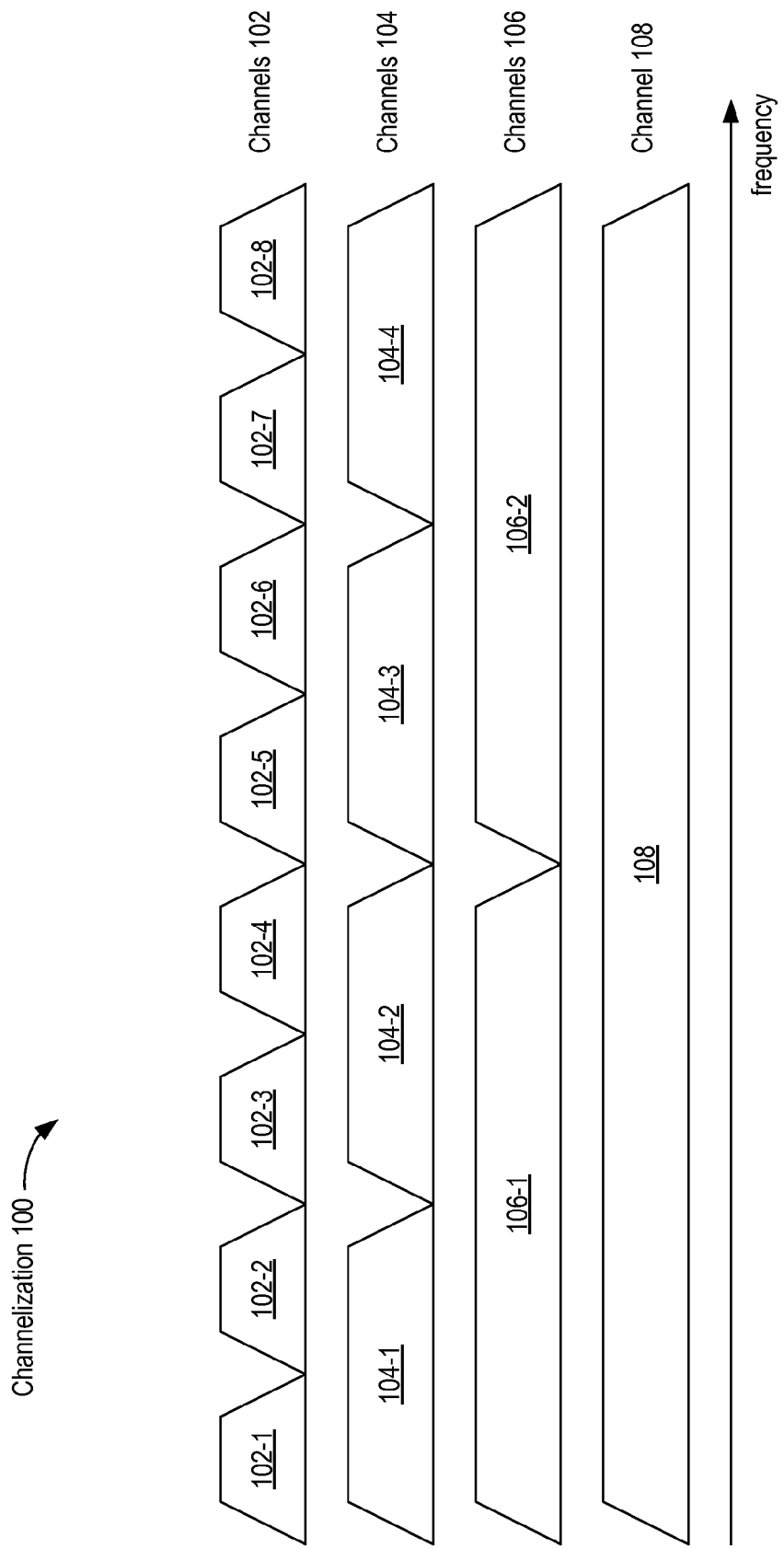
FIGS. 1A and 1B illustrate potential channelization of a frequency spectrum in accordance with some embodiments.

FIG. 1A illustrates potential channelization 100 of a frequency spectrum in accordance with some embodiments. The frequency spectrum of FIG. 1A may include channels with different bandwidths. Channels 102 have a first bandwidth, channels 104 have a second bandwidth (e.g., that is twice the first bandwidth), channels 106 have a third bandwidth (e.g., that is twice the second bandwidth), and channels 108 have a fourth bandwidth (e.g., that is twice the third bandwidth). In one example, the channels 102 each have a bandwidth of 1 MHz, the channels 104 each have a bandwidth of 2 MHz, the channels 106 each have a bandwidth of 4 MHz, and the channels 108 each have a bandwidth of 8 MHz. Additional bandwidths are possible. For example, there may be 16 MHz channels in addition to the 1, 2, 4, and 8 MHz channels. FIG. 1A shows eight channels 102-1 through 102-8, four channels 104-1 through 104-4, two channels 106-1 and 106-2, and a single channel 108. In general, however, the number of channels of each bandwidth may vary.

In some embodiments, packets may be transmitted on any of the channels 102, 104, 106, and 108. Alternatively, packets may be transmitted on a specified subset of the channels 102, 104, 106, and/or 108. For example, only alternating ones of the channels 102 may be available, while all of the channels 104, 106, and 108 are available. Regardless, a receiver may not know in advance which channel of which bandwidth is being used for a particular packet. Accordingly, to be compatible with the channelization 100, a receiver should be able to detect packets without knowing the respective channels they are on and thus without knowing their respective bandwidths. The receiver performs bandwidth classification on a packet-by-packet basis to determine the respective bandwidths and channels.

Figure 1B:
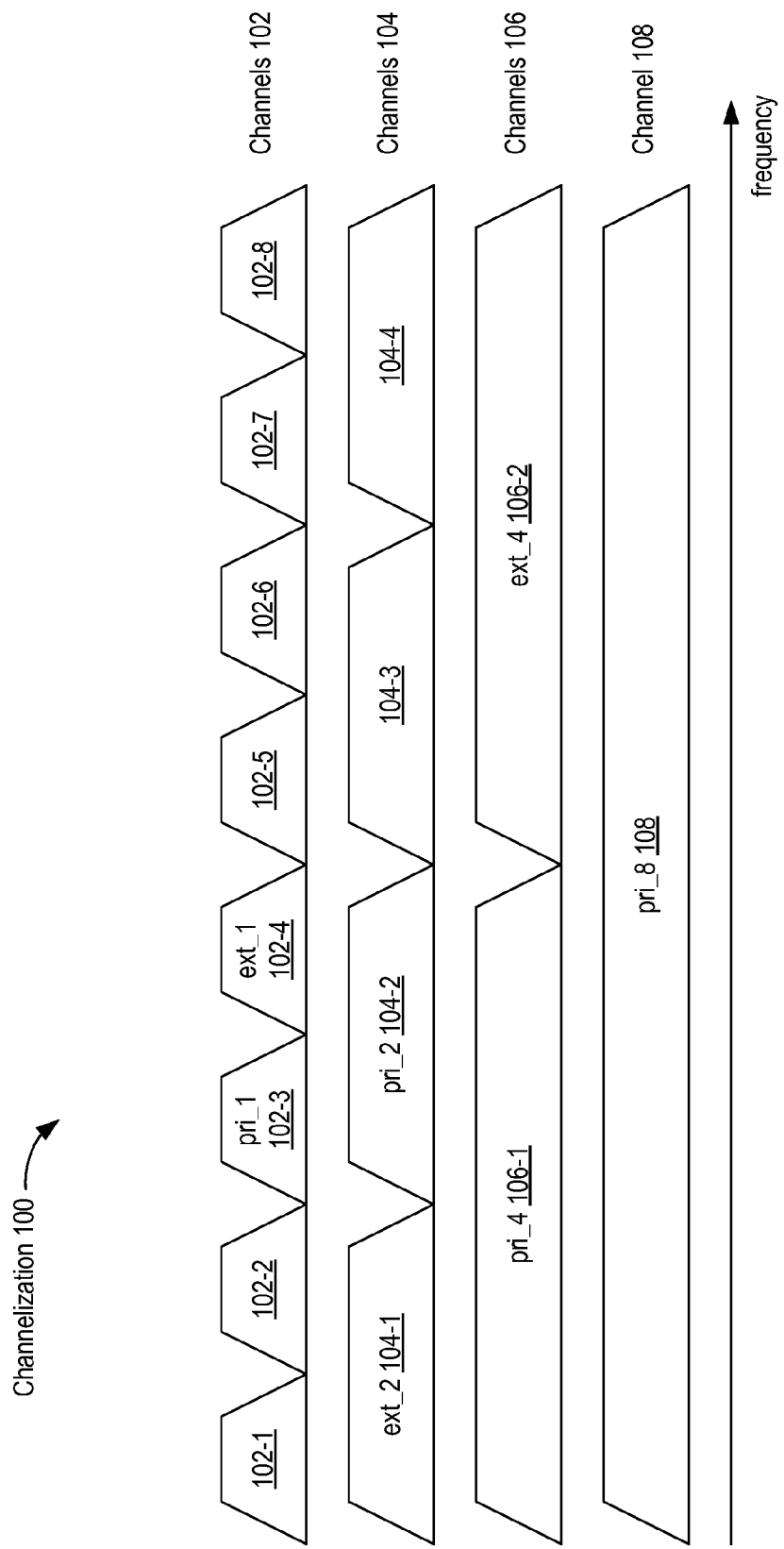

A particular channel 102 may be specified as a primary channel of the first bandwidth ("pri_1"). FIG. 1B shows an example in which channel 102-3 has been specified as pri_1. The channel 104 that includes pri_1, channel 104-2, is identified as a primary channel of the second bandwidth ("pri_2"). The other channel 102 within pri_2, channel 102-4, is identified as an extended channel of the first bandwidth ("ext_1"). The channel 106 that includes pri_2, channel 106-1, is identified as a primary channel of the third bandwidth ("pri_4"). The other channel 104 within pri_4, channel 104-1, is identified as an extended channel of the second bandwidth ("ext_2"). The channel 108 that includes pri_4 is identified as a primary channel of the fourth bandwidth ("pri_8"). The other channel 106 within pri_8, channel 106-2, is identified as an extended channel of the third bandwidth ("pri_4").

Figure 2:
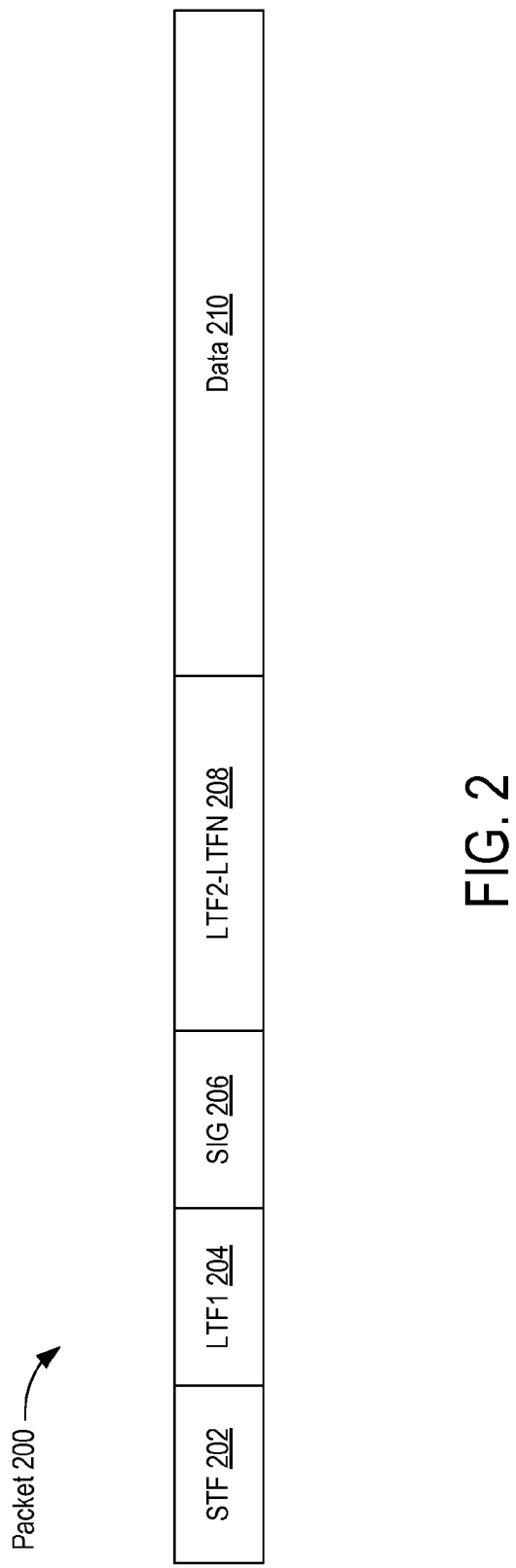
FIG. 2 is a block diagram showing fields in a packet in accordance with some embodiments.

FIG. 2 is a block diagram showing fields in a packet 200 in accordance with some embodiments. The packet 200 may be transmitted on a channel 102, 104, 106, or 108 (FIGS. 1A-1B), or on another available channel. The packet 200 includes a short training field (STF) 202, a first long training field (LTF1) 204, a signal field (SIG) 206 that includes packet metadata, additional long training fields (LTF2-LTFN) 208, and data 210. N is an integer greater than one that indicates the total number of long training fields. The data 210 includes the packet payload. The STF 202, while shown as a single field, is effectively a repeating sequence of short fields.

The STF 202, LTF1 204, SIG 206, and LTF2-LTFN 208 compose the preamble of the packet 200. (The packet 200 is merely one example of a packet; other examples are possible. Accordingly, other examples of packet preambles are possible.) The preamble may vary depending on the channel bandwidth. For example, packets on channels 102 (e.g., 1 MHz packets) may have different preambles than packets on channels 104, 106, and 108 (e.g., 2 MHz, 4 MHz, and 8 MHz packets). In some embodiments, packets on the channels 104, 106, and 108 include two symbols in the STF 202, two symbols in LTF1 204, and two symbols in SIG 206. Packets on the channels 102, however, include four symbols in the STF 202, four symbols in LTF1 204, and six symbols in SIG 206 in accordance with some embodiments. Furthermore, the pilot symbols used on the channels 102 may differ from the pilot symbols used on the channels 104, 106, and 108.

The repetitive, periodic structure of the STF 202 allows packets to be detected using auto-correlation. For example, averaged auto-correlation functions may be determined for signals on each of two adjacent channels (e.g., two adjacent channels 102), such as channels pri_1 and ext_1. The dot product of the two averaged auto-correlation functions is then determined. The dot product is proportional to the cosine of the phase difference between the signals on the two adjacent channels. If the dot product satisfies (e.g., is greater than, or greater than or equal to) a threshold, then the signals on the two adjacent channels are phase-aligned, which indicates that they originate from a common source and thus correspond to the same packet. Phase alignment of the signals indicates that they have a common carrier-frequency offset (CFO), which suggests that they originate from the same transmitter. CFO refers to the difference in frequency between a transmit clock in a transmitter and a receive clock in a receiver.

Figure 3:
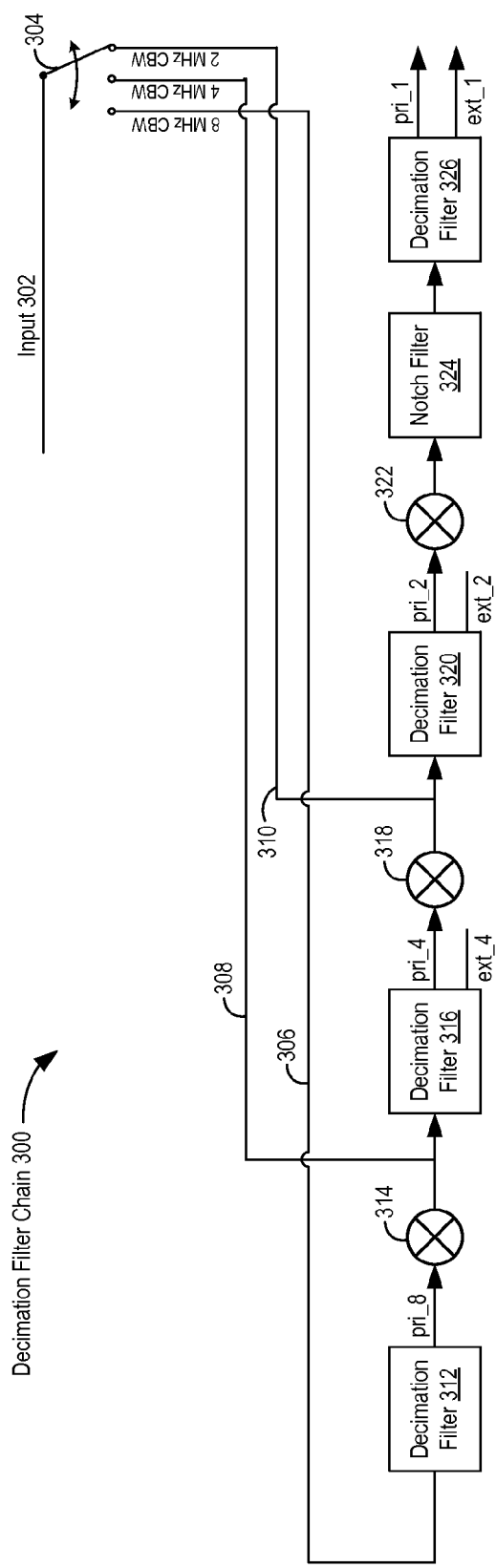
FIG. 3 is a circuit diagram of a decimation filter chain for extracting signals on adjacent channels in accordance with some embodiments.

The signals on two adjacent channels (e.g., pri_1 and ext_1) may be extracted using a decimation filter chain, so that their averaged auto-correlation functions may be determined and the dot product calculated. FIG. 3 is a circuit diagram of a decimation filter chain 300 for extracting signals on pri_1 and ext_1 in accordance with some embodiments. The decimation filter chain 300 includes a decimation filter 312, mixer 314, decimation filter 316, mixer 318, decimation filter 320, mixer 322, notch filter 324, and decimation filter 326 arranged in series as shown. A signal at an input 302 is routed to one of the decimation filters 312, 316, and 320, and thus to a particular stage of the decimation filter chain 300, depending on a setting of a switch 304. The switch 304 is set depending on the capability bandwidth (CBW) of the receiver in which the decimation filter chain 300 is situated. The CBW is the maximum channel bandwidth that the receiver can accommodate. In the example of FIG. 3, the possible values of CBW are 8 MHz, 4 MHz, and 2 MHz, and signals at the input 302 are oversampled at a rate of twice the CBW. The decimation filter chain 300 may include additional stages (e.g., an additional decimation filter and mixer) to accommodate additional CBW values (e.g., 16 MHz).

For an 8 MHz CBW, the switch 304 couples the input 302 to the decimation filter 312, which downsamples the oversampled input signal to extract the signal on pri_8. The mixer 314 downconverts the pri_8 signal and provides it to the decimation filter 316. For a 4 MHz CBW, the switch 304 couples the input 302 to the decimation filter 316. The decimation filter 316 extracts the signals on pri_4 and ext_4. The mixer 318 downconverts the signal on pri_4 and provides it to the decimation filter 320. For a 2 MHz CBW, the switch 304 couples the input 302 to the decimation filter 320. The decimation filter 320 extracts the signals on pri_2 and ext_2. The mixer 322 downconverts the signal on pri_2 and provides it to the notch filter 324, which performs direct-current (DC) removal. The decimation filter 326 then extracts the signals on pri_1 and ext_1.

In some embodiments, the decimation filters 312, 316, 320, and 326 and notch filter 324 are infinite-impulse response (IIR) filters.

Figure 4:
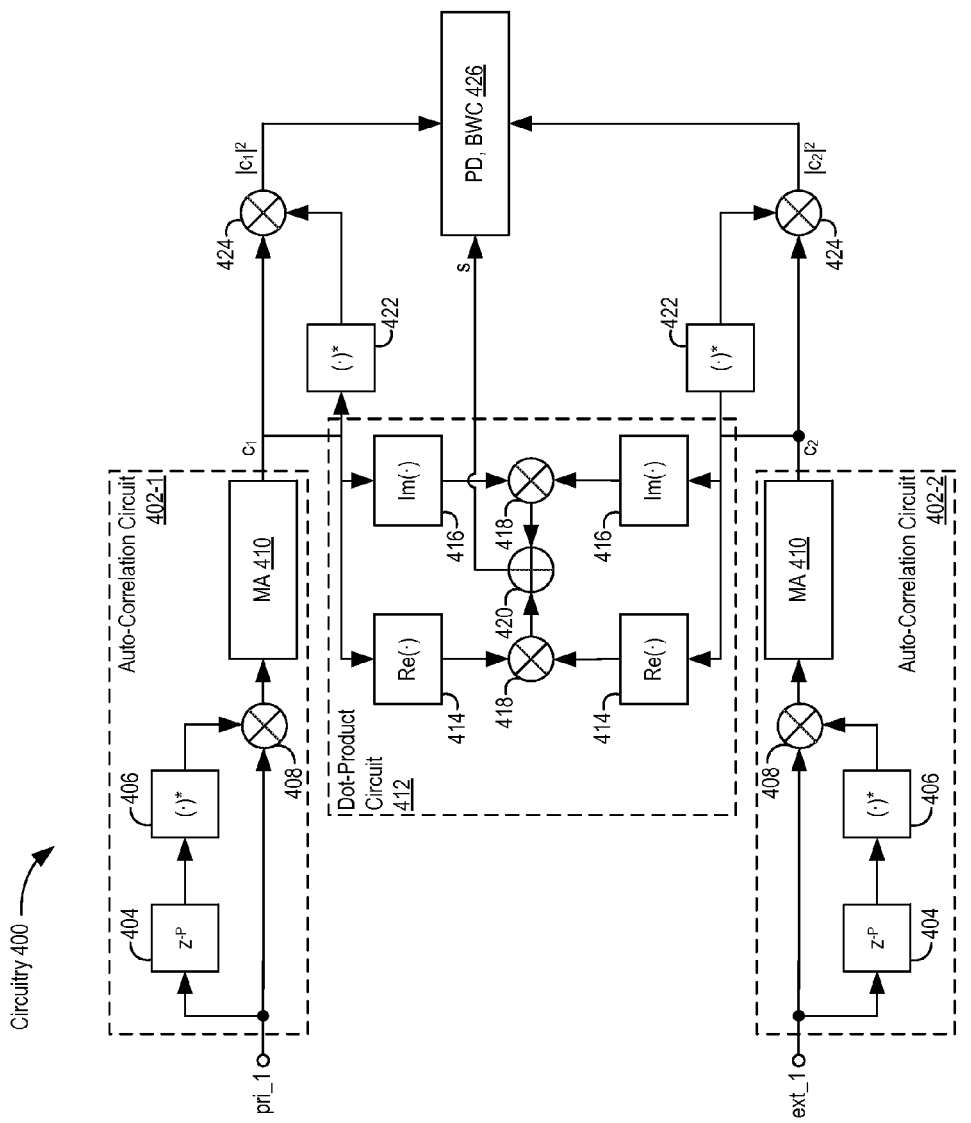
FIG. 4 is a circuit diagram showing circuitry for calculating averaged auto-correlation functions, calculating a dot product of the averaged auto-correlation functions, and performing packet detection and bandwidth classification based at least in part on the dot product, in accordance with some embodiments.

FIG. 4 is a circuit diagram showing circuitry 400 for calculating averaged auto-correlation functions, calculating a dot product of the averaged auto-correlation functions, and performing packet detection and bandwidth classification based at least in part on the dot product, in accordance with some embodiments. The pri_1 signal is provided as an input signal to a first auto-correlation circuit 402-1, which calculates a first averaged auto-correlation function. The ext_1 signal is provided as an input signal to a second auto-correlation circuit 402-2, which calculates a second averaged auto-correlation function. In each of the first and second auto-correlation circuits 402-1 and 402-2, a delay stage 404 delays the input signal by a number of cycles P, where P corresponds to a periodicity associated with a packet. For example, P is the periodicity of the STF 202 (FIG. 2). The delay stage 404 is coupled to a complex-conjugate module 406, which takes the complex conjugate of the delayed signal. A multiplier 408 multiplies the delayed, conjugated signal but the undelayed, unconjugated input signal to produce a raw, unaveraged auto-correlation function. A filter 410 takes a moving average (MA) of the unaveraged auto-correlation function, resulting in an averaged auto-correlation function. The first auto-correlation circuit 402-1 provides a first averaged auto-correlation function $c_1$ and the second auto-correlation circuit 402-2 provides a second averaged auto-correlation function $c_2$.

The first averaged auto-correlation function $c_1$ and the second averaged auto-correlation function $c_2$ are provided to a dot-product circuit 412, which calculates a dot product $s = c_1 \cdot c_2$:

$$s = |c_1||c_2| \cos(\phi_2 - \phi_1) = Re\{c_1\}Re\{c_2\} + Im\{c_1\}Im\{c_2\}$$

where $|c_1|$ and $|c_2|$ are the respective magnitudes of $c_1$ and $c_2$, $\phi_1$ and $\phi_2$ are the respective phases of $c_1$ and $c_2$, $Re\{c_1\}$ and $Re\{c_2\}$ are the respective real components of $c_1$ and $c_2$, and $Im\{c_1\}$ and $Im\{c_2\}$ are the respective imaginary components of $c_1$ and $c_2$. The dot product s thus is proportional to the cosine of the phase difference between $c_1$ and $c_2$, which corresponds to the phase difference between the signal on pri_1 and the signal on ext_1.

The dot-product circuit 412 includes modules 414 to extract $Re\{c_1\}$ and $Re\{c_2\}$ and modules 416 to extract $Im\{c_1\}$ and $Im\{c_2\}$. Respective multipliers 418 multiply $Re\{c_1\}$ by $Re\{c_2\}$ and $Im\{c_1\}$ by $Im\{c_2\}$; the resulting products are summed by a combiner 420 to produce s. The dot-product circuit 412 provides s to a packet-detection and bandwidth-classification (PD, BWC) circuit 426.

The first averaged auto-correlation function $c_1$ and the second averaged auto-correlation function $c_2$ are also provided to respective complex-conjugate modules 422, which produce the complex conjugates $c_1^*$ and $c_2^*$. Multipliers 424 multiply $c_1$ by $c_1^*$ and $c_2$ by $c_2^*$ to produce, respectively, $|c_1|^2$ and $|c_2|^2$ (i.e., the squared magnitudes of the first and second averaged auto-correlation functions). The values $|c_1|^2$ and $|c_2|^2$ are provided to the packet-detection and bandwidth-classification circuit 426 along with s.

Figure 5:
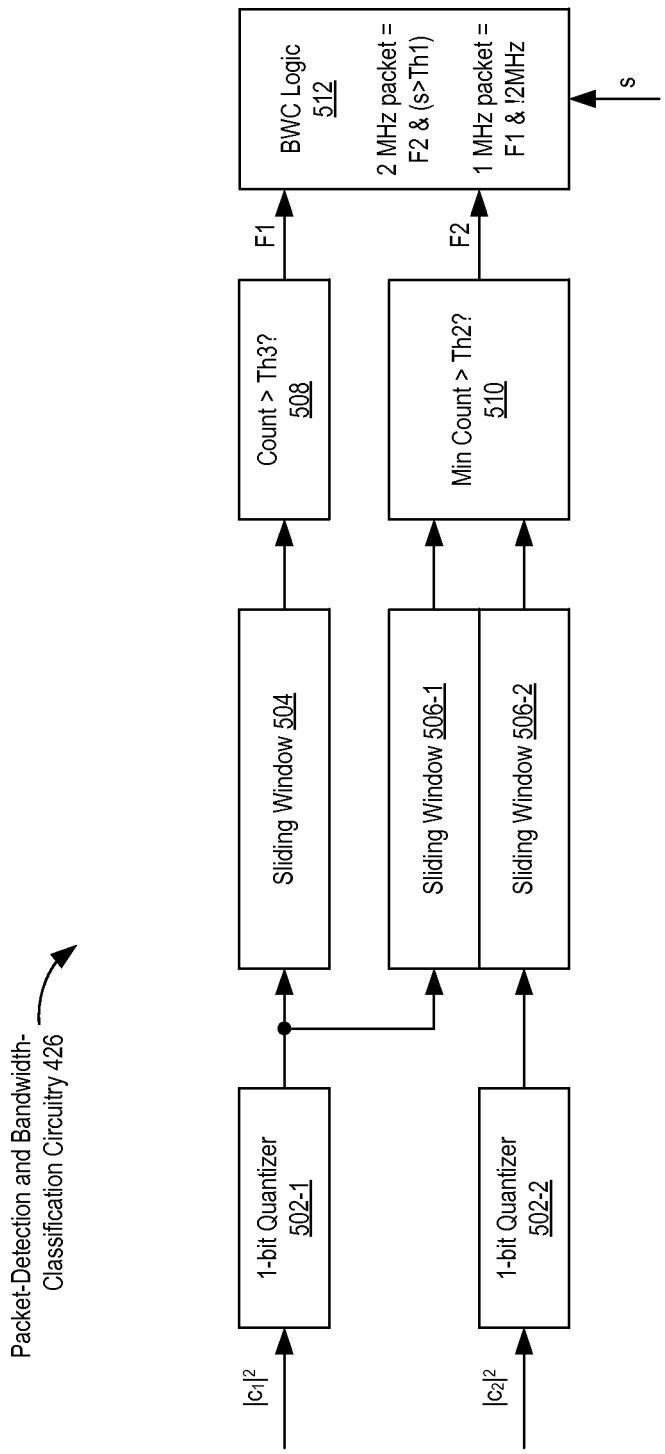
FIG. 5 is a block diagram of packet-detection and bandwidth-classification circuitry in accordance with some embodiments.

FIG. 5 is a block diagram of the packet-detection and bandwidth-classification circuit 426 in accordance with some embodiments. The values $|c_1|^2$ and $|c_2|^2$ are provided to respective single-bit quantizers 502-1 and 502-2, which produce respective first and second quantized signals. Because the quantizers 502-1 and 502-2 are single-bit quantizers, the first and second quantized signals are each a series of single-bit values. The first quantized signal as produced by the quantizer 502-1 is asserted when $|c_1|^2$ exceeds (or equal or exceeds) a specified level and is otherwise de-asserted. The second quantized signal as produced by the quantizer 502-2 is asserted when $|c_2|^2$ exceeds (or equal or exceeds) the specified level and is otherwise de-asserted.

A sliding window 504 of a first frequency corresponding to the bandwidth of the channel pri_1 (e.g., 1 MHz) is applied to the first quantized signal. Logic 508 counts how many times the first quantized signal is asserted during the sliding window 504 and determines whether the count satisfies (e.g., is greater than, or greater than or equal to) a third threshold (Th3). If the count satisfies the third threshold, a first flag F1 is asserted; if not, the first flag F1 is de-asserted. The count is an indication of the magnitude of $c_1$ (i.e., of the first averaged auto-correlation function). Assertion of F1 indicates that that magnitude of $c_1$ is high enough to indicate the presence of a packet on pri_1, but provides no indication as to whether the packet is or is not also present on ext_1. For example, F1 will be asserted when a 1 MHz packet is present on pri_1 and also when a wider-bandwidth packet is present on a wider channel that includes pri_1.

A sliding window 506-1 of a second frequency corresponding to the combined bandwidth of channels pri_1 and ext_1 (e.g., 2 MHz) is applied to the first quantized signal. Likewise, a sliding window 506-2 of the second frequency is applied to the second quantized signal. Logic 510 counts how many times the first and second quantized signals are asserted during their respective sliding windows 506-1 and 506-2 and determines whether both counts satisfy (e.g., are greater than, or greater than or equal to) a second threshold (Th2). For example, the logic 510 identifies the minimum (i.e., the lesser) of the two counts and determines whether the minimum (i.e., lesser) count satisfies the threshold. If both counts satisfy the second threshold, a second flag F2 is asserted; if not, the second flag F2 is de-asserted. The counts are indications of the respective magnitudes of $c_1$ and $c_2$. Assertion of F2 indicates that these magnitudes are high enough to indicate the presence of packet signals on both pri_1 and ext_1. Assertion of F2 does not indicate, however, whether these signals are for the same packet. But that determination can be made by determining whether the dot product s satisfies (e.g., is greater than, or greater than or equal to) a first threshold (Th1).

The flags F1 and F2 and the dot product s are provided to bandwidth classification (BWC) logic 512. If F2 is asserted and s satisfies the first threshold, then the BWC logic 512 determines that a packet is present on a channel that includes both pri_1 and ext_1. For example, the BWC logic 512 determines that a 2 MHz packet is present on pri_2. If the condition that F2 is asserted and s satisfies the first threshold is not satisfied (as indicated by the shorthand "!2 MHz", for "not 2 MHz", in FIG. 5), but F1 is asserted, then the BWC logic 512 determines that a packet (e.g., a 1 MHz packet) is present on pri_1 but not ext_1. Otherwise, the BWC logic 512 determines that no packet is present on either pri_1 or ext_1.

Figure 6A:
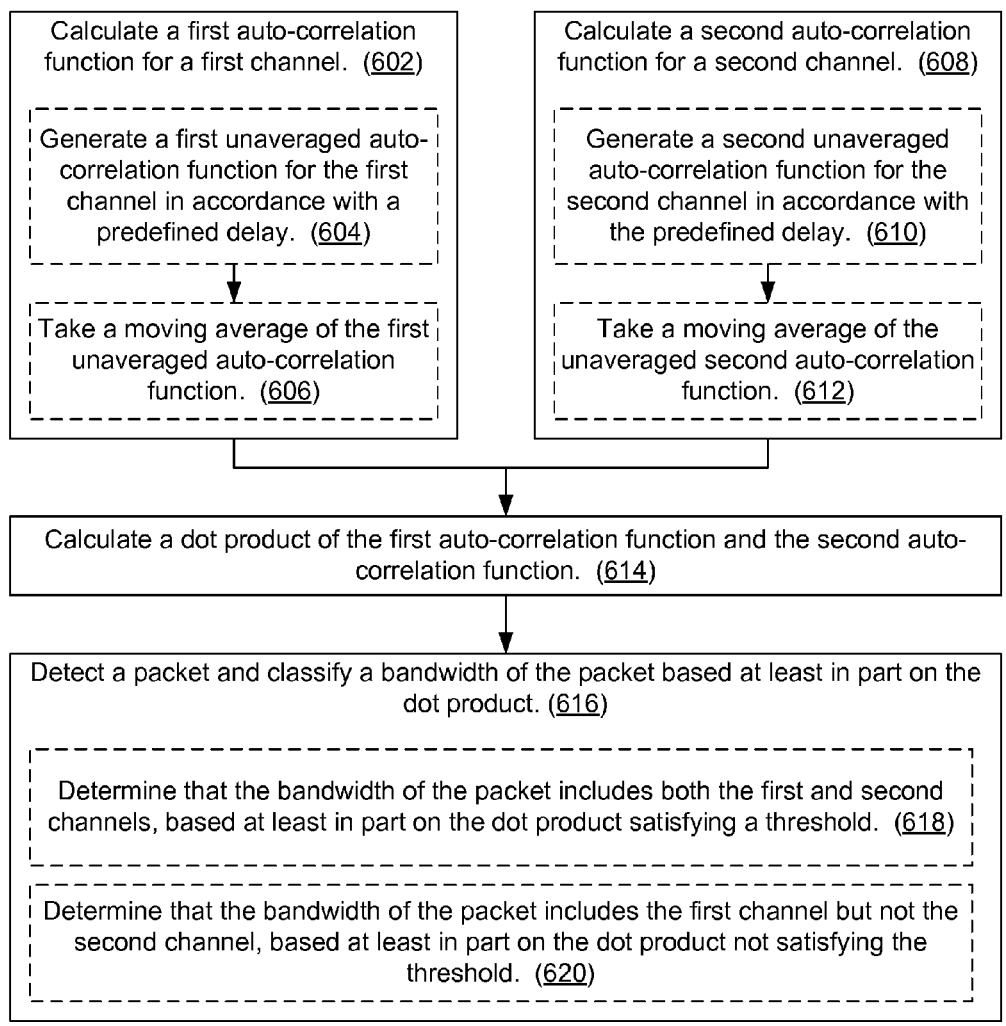
FIGS. 6A and 6B are flowcharts showing methods of detecting packets and classifying their bandwidths in accordance with some embodiments.

FIG. 6A is a flowchart showing a method 600 of detecting packets and classifying their bandwidths in accordance with some embodiments. The method 600 may be performed in a receiver (e.g., a receiver of a wireless device). For example, the method 600 is performed using the circuitry 400 (FIG. 4).

A first auto-correlation function is calculated (602) for a first channel and a second auto-correlation function is calculated (608) for a second channel. In some embodiments, calculating (602) the first auto-correlation function includes generating (604) a first unaveraged auto-correlation function for the first channel, in accordance with a predefined delay, and taking (606) a moving average of the first unaveraged auto-correlation function (e.g., using the auto-correlation circuit 402-1, FIG. 4). Similarly, in some embodiments calculating (608) the second auto-correlation function includes generating (610) a second unaveraged auto-correlation function for the second channel, in accordance with the predefined delay, and taking (612) a moving average of the second unaveraged auto-correlation function (e.g., using the auto-correlation circuit 402-2, FIG. 4). The predefined delay corresponds to a training-field periodicity for received packets (e.g., a periodicity of the STF 202, FIG. 2).

For example, the first auto-correlation function is the first averaged auto-correlation function $c_1$ (FIG. 4) and the second auto-correlation function is the second averaged auto-correlation function $c_2$ (FIG. 4). The first and second channels thus may be pri_1 and ext_1.

A dot product of the first auto-correlation function and the second auto-correlation function is calculated (614). For example, the dot product s is calculated using the dot-product circuit 412 (FIG. 4)

A packet is detected and its bandwidth classified (616) based at least in part on the dot product (e.g., using the packet-detection and bandwidth-classification circuit 426, FIGS. 4 and 5). It may be determined (618) that the bandwidth of the packet includes both the first and second channels (e.g., pri_1 and ext_1), based at least in part on the dot product satisfying a threshold (e.g., Th1, FIG. 5). Alternatively, it may be determined (620) that the bandwidth of the packet includes the first channel (e.g., pri_1) but not the second channel (e.g., ext_1), based at least in part on the dot product not satisfying the threshold. The receiver proceeds to receive the packet in accordance with the determined bandwidth.

Figure 6B:
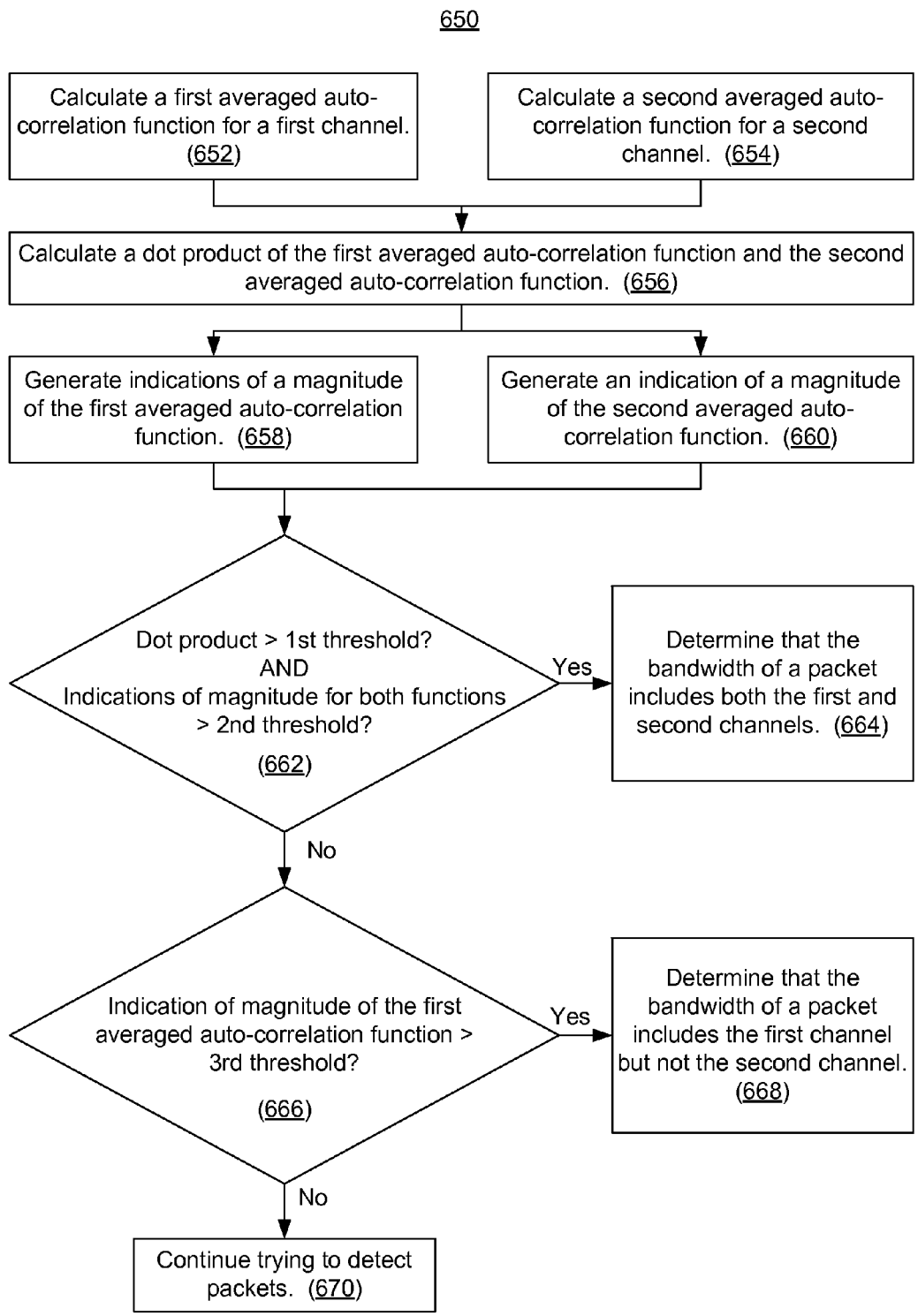

FIG. 6B is a flowchart showing a method 650 of detecting packets and classifying their bandwidths in accordance with some embodiments. The method 650 is an example of the method 600 (FIG. 6A) and may be performed in a receiver (e.g., a receiver of a wireless device). For example, the method 650 is performed using the circuitry 400 (FIG. 4).

A first averaged auto-correlation function (e.g., $c_1$, FIG. 4) is calculated (652) for a first channel (e.g., pri_1) and a second averaged auto-correlation function (e.g., $c_2$, FIG. 4) is calculated (654) for a second channel (e.g., ext_1).

A dot product (e.g., s, FIG. 4) of the first averaged auto-correlation function and the second averaged auto-correlation function is calculated (656).

Indications of a magnitude of the first averaged auto-correlation function are generated (658). An indication of a magnitude of the second averaged auto-correlation function is also generated (660).

In some embodiments, generating the indications of magnitude of the first and second averaged auto-correlation functions includes calculating squared magnitudes (e.g., $|c_1|^2$ and $|c_2|^2$) of the first and second averaged auto-correlation functions. Single-bit quantization of the squared magnitudes is performed (e.g., using single-bit quantizers 502-1 and 502-2, FIG. 5) to produce respective first and second quantized signals. Instances in which the first and second quantized signals are asserted are counted to produce respective first and second counts, which are respective indicators of the magnitudes of the first and second averaged auto-correlation functions. For example, the sliding windows 506-1 and 506-2 (FIG. 5) are applied to the first and second quantized signals. Furthermore, two indications of magnitude of the first averaged auto-correlation function may be calculated. For example, a count is determined by applying the sliding window 504 and another count is determined using the sliding window 506-1.

It is determined (662) whether the dot product satisfies (e.g., is greater than, or greater than or equal to) a first threshold and whether indications of magnitude for both the first and second averaged auto-correlation functions (e.g., the counts produced using the sliding windows 506-1 and 506-2, FIG. 5) exceed a second threshold. If both of these conditions are satisfied (662—Yes), then it is determined that the bandwidth of the packet includes (664) both the first and second channels. The packet is therefore present on a wider channel that includes both the first and second channels. The receiver receives the packet accordingly.

If at least one of the conditions of the determination 662 is not satisfied (662—No), then it is determined (666) whether an indication of magnitude of the first averaged auto-correlation function (e.g., the count produced using the sliding window 504, FIG. 5) satisfies (e.g., is greater than, or greater than or equal to) a third threshold. If so (666—Yes), it is determined that the bandwidth of the packet includes (668) the first channel (e.g., pri_1) but not the second channel (e.g., ext_1). The packet therefore is present on the first channel but not the second channel. The receiver receives the packet accordingly. If not (666—No), then no packet has been detected, and the receiver continues (670) to try to detect packets (e.g., by repeating the method 650).

The determinations 662 and 666 are made, for example, by the BWC logic 512 (FIG. 5).

The methods 600 and 650 allow for reliable packet detection without prior knowledge of packet bandwidths, even when packets of different bandwidths have different preambles. Furthermore, the methods 600 and 650 offer efficient packet detection of relatively low complexity.

While the methods 600 and 650 include a number of operations that appear to occur in a specific order, it should be apparent that the methods 600 and 650 can include more or fewer operations and that operations can be executed serially or in parallel. An order of two or more operations may be changed, performance of two or more operations may overlap, and two or more operations may be combined into a single operation.

Figure 7:
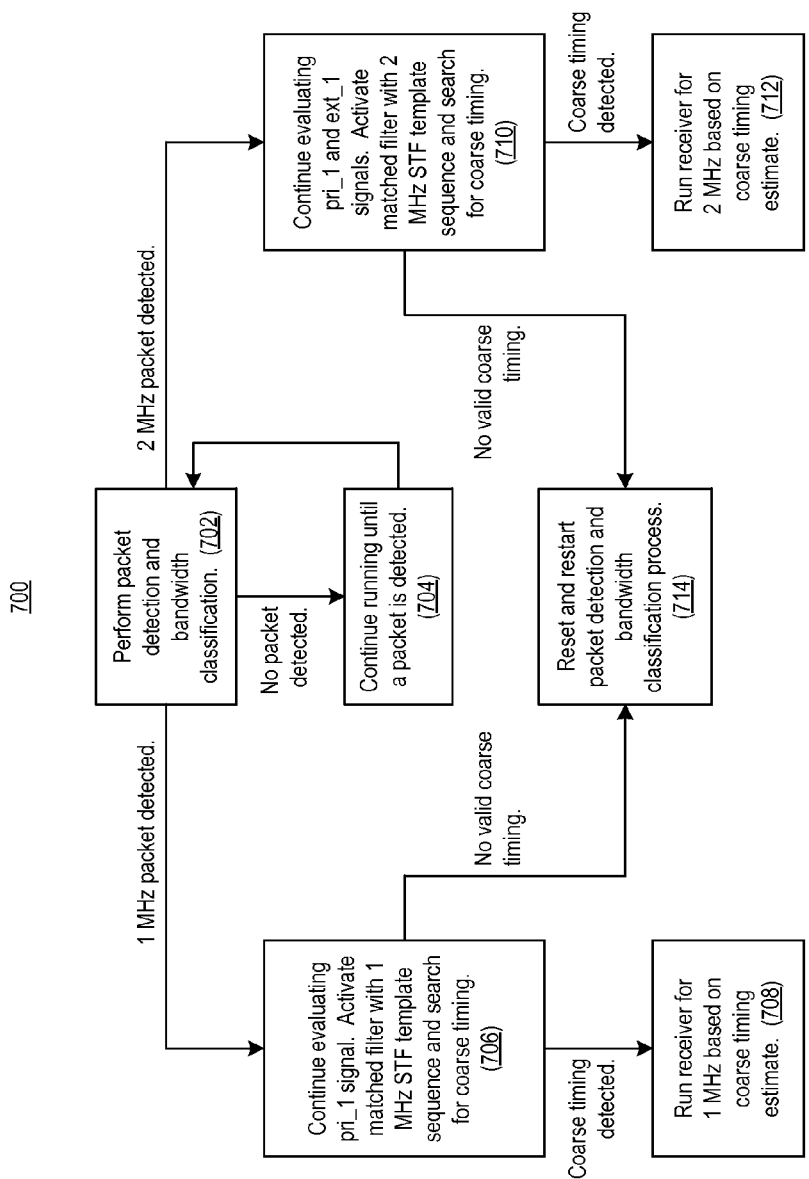
FIG. 7 is a flowchart showing a method of receiving packets in accordance with some embodiments.

FIG. 7 is a flowchart showing a method 700 of receiving packets in accordance with some embodiments. The method 700 may be performed in the same receiver that performs the methods 600 (FIG. 6A) (e.g., the method 650, FIG. 6B).

Packet detection and bandwidth classification is performed (702), for example by performing the method 600 (FIG. 6A), an example of which is the method 650 (FIG. 6B). If a 2 MHz packet is detected (or more generally, a packet is determined to be on a channel that includes both pri_1 and ext_1), then evaluation of the signals on pri_1 and ext_1 continues (710). A matched filter with an STF template sequence corresponding to the packet bandwidth (e.g., a 2 MHz STF template sequence) is activated and used to search for coarse timing associated with the packet. If the coarse timing is successfully estimated (i.e., detected) within a specified number of cycles, then the receiver is run (712) for 2 MHz packet reception (or packet reception on both pri_1 and ext_1) based on the coarse timing estimate. If the coarse timing is not successfully estimated within the specified number of cycles, however, then the packet detection and bandwidth classification process is reset and restarted (714) (e.g., by returning to operation 702).

If a 1 MHz packet is detected (or more generally, a packet is determined to be on pri_1 but not ext_1), then evaluation of the signal on pri_1 continues (706). A matched filter with an STF template sequence corresponding to the packet bandwidth (e.g., a 1 MHz STF template sequence) is activated and used to search for coarse timing associated with the packet. If the coarse timing is successfully estimated (i.e., detected) within a specified number of cycles, then the receiver is run (708) for 1 MHz packet reception (or packet reception on pri_1) based on the coarse timing estimate. If the coarse timing is not successfully estimated within the specified number of cycles, however, then the packet detection and bandwidth classification process is reset and restarted (714) (e.g., by returning to operation 702).

If no packet is detected, the packet detection process continues to run (704) until a packet is detected.

Accordingly, the method 700 searches for a timing estimate in response to detecting a packet. If the timing estimate is not identified within a specified time period, then the attempt to receive the packet stops. If the timing estimate is identified within the specified time period, then the packet is received on the channel(s) identified during the bandwidth classification process.

The method 700 serves as a check on the method 600 (FIG. 6A) (e.g., on the method 650, FIG. 6B): failure to establish the coarse timing estimate within the specified number of cycles indicates that the packet detection that occurred in the method 600 (e.g., in the method 650) was spurious. The method 700 thus identifies spurious packet detection and resets the packet detection process.

In some embodiments, the methods 600 (FIG. 6A), 650 (FIG. 6B), and/or 700 (FIG. 7) are performed in hardware in a receiver. For example, the method 600 (e.g., the method 650) is performed using the circuitry 400 (FIG. 4). Alternatively, the methods 600, 650, and/or 700 may be performed in software.

Figure 8:
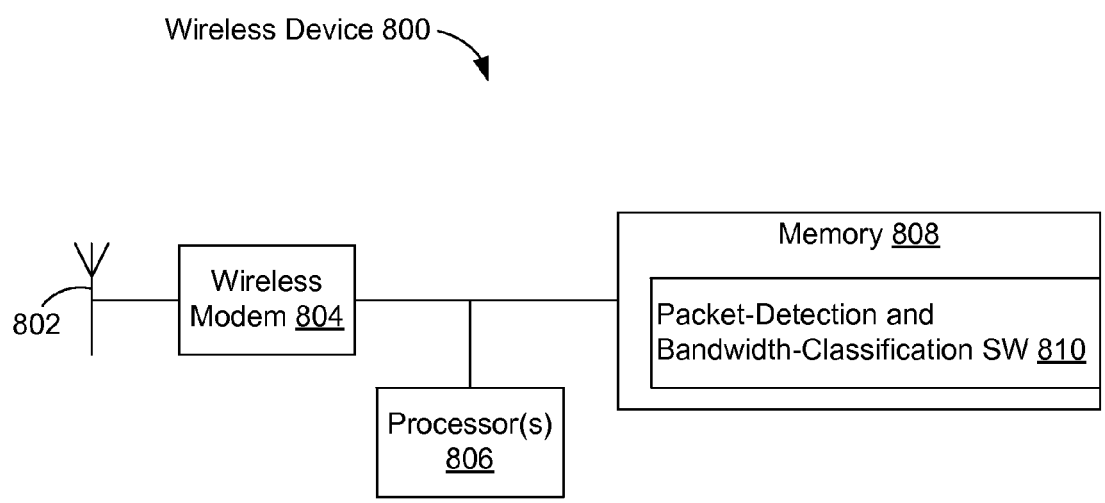
FIG. 8 is a block diagram of a wireless device that may perform the methods of FIGS. 6A, 6B, and/or 7 in software in accordance with some embodiments.

FIG. 8 is a block diagram of a wireless device 800 that may perform the methods 600, 650, and/or 700 in software in accordance with some embodiments. The wireless device 800 includes one or more antennas 802 coupled to a wireless modem 804 that transmits and receives signals through the one or more antennas 802. The wireless device 800 also includes memory 808 and one or more processors 806. The memory 808 stores one or more programs with instructions configured for execution by the one or more processors 806. The one or more programs may be stored in a non-transitory computer-readable storage medium (e.g., non-volatile memory) in the memory 808. The one or more programs include packet-detection and bandwidth-classification software 810 with instructions that, when executed by the one or more processors 806, cause the wireless device 800 to perform the methods 600, 650, and/or 700. Accordingly, the memory 808 may include instructions on a non-transitory computer-readable storage medium for performing all or a portion of the methods 600, 650, and/or 700.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of packet detection and bandwidth classification, comprising:
    calculating a first averaged auto-correlation function for a first channel, wherein calculating the first averaged auto-correlation function comprises generating a first unaveraged auto-correlation function for the first channel in accordance with a predefined delay and taking a moving average of the first unaveraged auto-correlation function;
    calculating a second averaged auto-correlation function for a second channel, wherein calculating the second averaged auto-correlation function comprises generating a second unaveraged auto-correlation function for the second channel in accordance with the predefined delay and taking a moving average of the second unaveraged auto-correlation function;
    calculating a dot product of the first averaged auto-correlation function and the second averaged auto-correlation function; and
    detecting a packet, the detecting comprising classifying a bandwidth of the packet based at least in part on the dot product.

2. The method of claim 1, wherein the predefined delay corresponds to a training-field periodicity for the packet.

3. The method of claim 1, wherein classifying the bandwidth comprises determining that the bandwidth of the packet includes both the first and second channels, based at least in part on the dot product satisfying a first threshold.

4. The method of claim 3, further comprising:
    generating an indication of a magnitude of the first averaged auto-correlation function;
    generating an indication of a magnitude of the second averaged auto-correlation function; and
    determining that the indications of the magnitudes of the first and second averaged auto-correlation functions satisfy a second threshold;
    wherein determining that the bandwidth of the packet includes both the first and second channels is based further on the indications of the magnitudes of the first and second averaged auto-correlation functions satisfying the second threshold.

5. The method of claim 4, wherein:
    generating the indications of the magnitudes of the first and second averaged auto-correlation functions comprises:
        calculating squared magnitudes of the first and second averaged auto-correlation functions;
        performing single-bit quantization of the squared magnitudes of the first and second averaged auto-correlation functions to produce respective first and second quantized signals; and
        counting instances in which the first and second quantized signals are asserted to produce respective first and second counts; and
    determining that the indications of the magnitudes of the first and second averaged auto-correlation functions satisfy the second threshold comprises verifying that the first and second counts satisfy the second threshold.

6. The method of claim 5, wherein counting the instances in which the first and second quantized signals are asserted comprises applying sliding windows to the first and second quantized signals.

7. The method of claim 1, wherein classifying the bandwidth comprises determining that the bandwidth of the packet includes the first channel but not the second channel, based at least in part on the dot product not satisfying a first threshold.

8. The method of claim 7, further comprising:
    generating an indication of a magnitude of the first averaged auto-correlation function; and
    determining that the indication of the magnitude of the first averaged auto-correlation function satisfies a third threshold;
    wherein determining that the bandwidth of the packet includes the first channel but not the second channel is further based on the indication of the magnitude of the first averaged auto-correlation function satisfying the third threshold.

9. The method of claim 8, wherein:
    generating the indication of a magnitude of the first averaged auto-correlation function comprises:
        calculating a squared magnitude of the first averaged auto-correlation function;
        performing single-bit quantization of the squared magnitude of the first averaged auto-correlation function to produce a quantized signal; and
        counting instances in which the quantized signal is asserted to produce a count; and
    determining that the indication of the magnitude of the first averaged auto-correlation function satisfies the third threshold comprises verifying that the count satisfies the third threshold.

10. The method of claim 9, wherein counting instances in which the quantized signal is asserted comprises applying a sliding window to the quantized signal.

11. The method of claim 1, further comprising:
   searching for a timing estimate for the packet;
   failing to identify the timing estimate within a specified time period; and
   in response to failing to identify the timing estimate, stopping an attempt to receive the packet.

12. The method of claim 1, wherein classifying the bandwidth comprises determining that the bandwidth of the packet includes both the first and second channels, the method further comprising:
   searching for a timing estimate for the packet;
   identifying the timing estimate within a specified time period; and
   receiving the packet on the first and second channels in accordance with the timing estimate.

13. The method of claim 1, wherein classifying the bandwidth comprises determining that the bandwidth of the packet includes the first channel but not the second channel, the method further comprising:
   searching for a timing estimate for the packet;
   identifying the timing estimate within a specified time period; and
   receiving the packet on the first channel in accordance with the timing estimate.

14. A receiver, comprising:
   auto-correlation circuitry to:
      calculate a first averaged auto-correlation function for a first channel, wherein calculating the first averaged auto-correlation function comprises generating a first unaveraged auto-correlation function for the first channel in accordance with a predefined delay and taking a moving average of the first unaveraged auto-correlation function; and
      calculate a second averaged auto-correlation function for a second channel, wherein calculating the second averaged auto-correlation function comprises generating a second unaveraged auto-correlation function for the second channel in accordance with the predefined delay and taking a moving average of the second unaveraged auto-correlation function;
   dot-product circuitry to calculate dot products of the first averaged auto-correlation function and the second averaged auto-correlation function; and
   logic to detect packets and classify packet bandwidths based at least in part on the dot products.

15. The receiver of claim 14, wherein the logic comprises:
   logic to determine whether a bandwidth for a respective packet includes both the first and second channels, based at least in part on whether a respective dot product of the first averaged auto-correlation function and the second averaged auto-correlation function satisfies a first threshold; and
   logic to determine whether a bandwidth for a respective packet includes the first channel but not the second channel, based at least in part on whether a respective dot product of the first averaged auto-correlation function and the second averaged auto-correlation function does not satisfy the first threshold.

16. The receiver of claim 15, wherein:
   the receiver further comprises circuitry to generate indications of magnitudes of the first and second averaged auto-correlation functions; and
   the logic to determine whether the bandwidth for a respective packet includes both the first and second channels is based further on whether respective indications of the magnitudes of the first and second averaged auto-correlation functions both satisfy a second threshold.

17. The receiver of claim 16, wherein the circuitry to generate indications of magnitudes of the first and second averaged auto-correlation functions comprises circuitry to:
   calculate squared magnitudes of the first and second averaged auto-correlation functions;
   perform single-bit quantization of the squared magnitudes of the first and second averaged auto-correlation functions to produce respective first and second quantized signals; and
   count instances in which the first and second quantized signals are asserted to produce respective first and second counts.

18. The receiver of claim 15, wherein:
   the receiver further comprises circuitry to generate indications of magnitude of the first averaged auto-correlation function; and
   the logic to determine whether the bandwidth for a respective packet includes the first channel but not the second channel is based further on a respective indication of magnitude of the first averaged auto-correlation function satisfying a third threshold.

19. A receiver, comprising:
   means for calculating a first averaged auto-correlation function for a first channel, wherein calculating the first averaged auto-correlation function comprises generating a first unaveraged auto-correlation function for the first channel in accordance with a predefined delay and taking a moving average of the first unaveraged auto-correlation function; and
   means for calculating a second auto-correlation function for a second channel, wherein calculating the second averaged auto-correlation function comprises generating a second unaveraged auto-correlation function for the second channel in accordance with the predefined delay and taking a moving average of the second unaveraged auto-correlation function;
   means for calculating dot products of the first averaged auto-correlation function and the second averaged auto-correlation function; and
   means for detecting packets and classifying packet bandwidths based at least in part on the dot products.

* * * * *